US009286123B2

(12) United States Patent
Lee

(10) Patent No.: US 9,286,123 B2
(45) Date of Patent: Mar. 15, 2016

(54) APPARATUS AND METHOD FOR MANAGING STREAM PROCESSING TASKS

(71) Applicant: ELECTRONICS AND TELECOMMUNICATIONS RESEARCH INSTITUTE, Daejeon (KR)

(72) Inventor: Myung-Cheol Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 64 days.

(21) Appl. No.: 14/225,661

(22) Filed: Mar. 26, 2014

(65) Prior Publication Data

US 2014/0351820 A1 Nov. 27, 2014

(30) Foreign Application Priority Data

May 23, 2013 (KR) ........................ 10-2013-0058255

(51) Int. Cl.
*G06F 9/46* (2006.01)
*G06F 9/50* (2006.01)
*G06F 9/48* (2006.01)

(52) U.S. Cl.
CPC ............ *G06F 9/5016* (2013.01); *G06F 9/4881* (2013.01)

(58) Field of Classification Search
CPC .................................................. G06F 9/5016
See application file for complete search history.

(56) References Cited

U.S. PATENT DOCUMENTS

| 7,155,716 | B2 * | 12/2006 | Hooman et al. | 718/102 |
| 2004/0185867 | A1 * | 9/2004 | Wassew et al. | 455/453 |
| 2006/0168571 | A1 * | 7/2006 | Ghiasi et al. | 717/127 |
| 2007/0162906 | A1 * | 7/2007 | Chandhoke | 718/100 |
| 2007/0288538 | A1 * | 12/2007 | Bacon et al. | 707/206 |
| 2009/0313631 | A1 * | 12/2009 | De Marzo et al. | 718/103 |
| 2009/0315903 | A1 * | 12/2009 | Ishikawa | 345/530 |
| 2012/0233224 | A1 | 9/2012 | Gowdra | |
| 2014/0351820 | A1 * | 11/2014 | Lee | 718/103 |

FOREIGN PATENT DOCUMENTS

KR 1020130010314 A 1/2013

OTHER PUBLICATIONS

Leonardo Neumeyer, et al; "S4: Distributed Stream Computing Platform", Published in: Data Mining Workshops (ICDMW), 2010 IEEE International Conference on, Date of Conference: Dec. 13-13, 2010; pp. 170-177.

* cited by examiner

*Primary Examiner* — Philip Wang
(74) *Attorney, Agent, or Firm* — Ladas & Parry LLP

(57) ABSTRACT

An apparatus and method for managing stream processing tasks are disclosed. The apparatus includes a task management unit and a task execution unit. The task management unit controls and manages the execution of assigned tasks. The task execution unit executes the tasks in response to a request from the task management unit, collects a memory load state and task execution frequency characteristics based on the execution of the tasks, detects low-frequency tasks based on the execution frequency characteristics if it is determined that a shortage of memory has occurred based on the memory load state, assigns rearrangement priorities to the low-frequency tasks, and rearranges the tasks based on the assigned rearrangement priorities.

18 Claims, 8 Drawing Sheets

| MANAGEMENT METHOD | ADVANTAGES AND DISADVANTAGES | PERFOR-MANCE |
|---|---|---|
| TASK SWAPPING | +SPEED IS FAST BECAUSE THERE ARE MOST OF TASKS IN MEMORY<br><br>+TASKS ARE REARRANGED PERIODICALLY OR WHEN MEMORY IS SHORT<br><br>+IF IN-MEMORY TASKS ARE NOT PERMANENTLY STORED SEPARATELY, DATA IS LOST WHEN A NODE/PROCESS OBSTACLE OCCURS OR INACCURATE RESULTS ARE OBTAINED | FAST |
| TASK CASHING | +EVEN WHEN A NODE/PROCESS FAILURE OCCURS, THERE IS NO PROBLEM WITH LOSS OF DATA OR ACCURACY BECAUSE ALL TASKS ARE PERMANENTLY STORED<br><br>- IF IN-MEMORY TASKS VARY, THE VARIATION NEEDS TO BE REFLECTED ON THE ORIGINAL TASKS OF PERMANENT STORAGE TO MAINTAIN CONSISTENCY<br><br>- PERFORMANCE VARIES DEPENDING ON THE HIT RATIO OF AN IN-MEMORY TASK CACHE (WHEN DATA STREAMS ARE SEQUENTIALLY INPUT IN ACCORDANCE WITH AN APPLICATION, A CACHE MISS MAY CONTINUE TO OCCUR) | SLOW |

FIG. 7

APPARATUS AND METHOD FOR MANAGING STREAM PROCESSING TASKS

CROSS REFERENCE TO RELATED APPLICATION

This application claims the benefit of Korean Patent Application No. 10-2013-0058255, filed on May 23, 2013, which is hereby incorporated by reference in its entirety into this application.

BACKGROUND OF THE INVENTION

1. Technical Field

The present invention relates generally to an apparatus and method for managing stream processing tasks and, more particularly, to an apparatus and method for managing stream processing tasks that are capable of efficiently managing a massive number of stream processing tasks, which are consecutively executed in a stream processing system for processing explosively increasing data streams in real time, in an in-memory state depending on their frequency of execution.

2. Description of the Related Art

With the advent of the big data era, the quantity of data streams to be processed has rapidly increased, and the types of data streams have become more various. Accordingly, active research is being carried out into data stream distributed parallel processing capable of providing real-time data analysis and processing services for a large quantity of data streams.

An example of a data stream distributed parallel processing method is a data flow-based distributed parallel processing structure. As illustrated in FIG. 1, in the data flow-based distributed parallel processing method, a service 100 receives an input source 110, performs distributed parallel processing on the input source, and provides an output source 140. In this case, the input data processing method is represented by a Directed Acyclic Graph (DAG) that describes the definitions of multiple operations 121 to 125 in which queries or processing methods for data streams have been described and data flows which are generated between the operations. The operations 121 to 125 within the service 100 are split into multiple tasks 131 to 135, and are distributed, arranged, and executed in multiple nodes 111 to 115 within a cluster formed of multiple nodes.

In general, tasks are executed in the form of task threads that are managed by the task management process of each node in the node. Once the tasks are executed, the tasks are consecutively executed without terminating the threads, thereby enabling a large number of data streams to be rapidly processed consecutively in parallel.

A conventional data flow-based distributed parallel processing structure consecutively executes the tasks of a registered service based on input data streams. If a large number of tasks are executed at the same time depending on a application service, a problem arises in that files generated within a node are exhausted or a context switching load occurs between threads.

In order to solve such a problem regarding the generation of an excessive number of threads, a recent distributed stream processing system generates only a specific number of task executor threads that are managed by a task management process in each node. Tasks assigned to each node are managed in object form, not thread form, using a task object pool. The distributed stream processing system uses a method in which task executor threads fetch tasks from a plurality of task pools and transfer the input data streams to the node, so that the respective nodes process the input data streams.

For example, a word number calculation service for continuously counting the numbers of words included in sentences using a distributed stream processing system will be described below. The word number calculation service is an application service that counts the latest numbers of appearances of input words by counting the numbers of input words extracted from continuously input sentences. As illustrated in FIG. 2, each of tasks 221 to 225 counts the number of appearances of each word from input words 211 to 219 that are included in sentences. Only when the tasks 221 to 225 that count the numbers of appearances of input words to the present are maintained in memory, it is possible to count the numbers of all input words without omission.

Although a task is managed as an object (i.e., a task object), not a thread, as described above, the state of the task object needs to be continuously maintained in the memory. In this case, millions of task objects should be maintained in the memory even within a single application service.

Accordingly, the data distributed parallel processing system is problematic in that it is difficult to maintain all task objects in memory because an application service should process several hundreds of task objects at the same time if the number of task objects suddenly increases. In particular, a problem arises in that all tasks that are consecutively executed cannot be maintained in an in-memory device in a computing node having a very limited amount of memory.

In order to prevent the exhaustion of memory resources attributable to a large number of task objects, conventional distributed parallel processing systems utilize a method of increasing resources within a node. That is, the distributed parallel processing systems adopt a load shedding method for assigning more node resources, such as the resources of memory and a central processing unit (CPU), selectively discarding input streams, or selectively discarding stream processing tasks, in connection with a problematic operation. An example of the load shedding method is disclosed in an article issued in the U.S.A. entitled "S4: Distributed Stream Computing Platform" Proceedings of the ICDM Workshops (published on Dec. 12, 2010, related parts: pp. 170~177).

The distributed parallel processing systems perform a load migration method of migrating the task objects of an operation from a current node to another node and executing the task objects. An example of the load migration method is Korean Patent Application Publication No. 10-2013-0010314 entitled "Method and Apparatus for Processing Exploding Data Streams."

However, the method of increasing resources within a node is problematic in that it is difficult to apply the method to an on-line situation while service is being performed, and the method of deleting input data streams or stream processing tasks using load shedding is problematic in that it reduces the accuracy of consecutive query processing results.

Furthermore, the method of migrating the tasks of an operation to another node is not desirable in terms of cost because a plurality of nodes is required, and is also problematic in that the data transfer mapping relationship between a massive number of tasks is required to be set again.

SUMMARY OF THE INVENTION

Accordingly, the present invention has been made keeping in mind the above problems occurring in the conventional art, and an object of the present invention is to provide an apparatus and method for managing stream processing tasks, which, when memory resources are exhausted because of stream processing task objects, efficiently arrange tasks being executed in individual nodes between memory and a disk based on the analysis of the frequencies of execution of the tasks so as to be suitable for the execution frequency characteristics of the tasks, so that the tasks are executed under in-memory management. That is, the present invention provides an apparatus and method for managing stream processing tasks, which are capable of processing explosively increasing stream data in real time using a method of managing frequently executed tasks in an in-memory state without losing some of the explosively increasing stream data and decreasing the accuracy of stream processing results even in a limited memory situation.

In accordance with an aspect of the present invention, there is provided an apparatus for managing stream processing tasks, including a task management unit configured to control and manage the execution of assigned tasks; and a task execution unit configured to execute the tasks in response to a request from the task management unit, to collect a memory load state and task execution frequency characteristics based on the execution of the tasks, to detect low-frequency tasks based on the execution frequency characteristics if it is determined that a shortage of memory has occurred based on the memory load state, to assign rearrangement priorities to the low-frequency tasks, and to rearrange the tasks based on the assigned rearrangement priorities.

The task execution unit may collect the memory load state including the amount of memory used based on the execution of the tasks and the task execution frequency characteristics including the frequencies of use of the tasks, recent execution times, and sizes of task objects.

The task execution unit may determine that a shortage of memory has occurred if the amount of memory used included in the collected memory load state exceeds a predetermined amount of memory.

The task execution unit may detect the low-frequency tasks in active tasks included in an active task pool based on their frequencies of execution or recent execution times included in the collected task execution frequency characteristics.

The task execution unit may assign the rearrangement priorities based on the amounts of memory of the detected low-frequency tasks.

The task execution unit may generate task rearrangement information by arranging the rearrangement priorities in descending order, and may delete the low-frequency tasks from memory based on the rearrangement priorities included in the task rearrangement information.

The apparatus may further include a storage unit for storing tasks, and the task execution unit may store the detected low-frequency tasks in the storage unit.

The task execution unit may classify the tasks into active tasks and sleep tasks based on the collected task execution frequency characteristics, loads tasks classified as the active tasks onto memory, executes the loaded tasks, and stores tasks classified as the sleep tasks into the storage unit.

The task execution unit may load the sleep tasks detected from the storage unit onto the memory, may execute the loaded tasks, and may delete the sleep tasks from the memory once the execution of the sleep tasks has been completed.

The apparatus may further include an active task pool configured to manage the tasks classified as the active tasks by the task execution unit and a list of the tasks and a sleep task pool configured to manage a list of the tasks classified as the sleep tasks by the task execution unit, and the storage unit may store the tasks classified as the sleep tasks by the task execution unit.

In accordance with another aspect of the present invention, there is provided a method of managing stream processing tasks, including collecting, by an apparatus for managing stream processing tasks, a memory load state and task execution frequency characteristics based on the execution of tasks; determining, by the apparatus for managing stream processing tasks, whether or not a shortage of memory has occurred based on the collected memory load state; detecting, by the apparatus for managing stream processing tasks, low-frequency tasks based on the collected task execution frequency characteristics if, as a result of the determination, it is determined that a shortage of memory has occurred; assigning, by the apparatus for managing stream processing tasks, rearrangement priorities to the detected low-frequency tasks; generating, by the apparatus for managing stream processing tasks, task rearrangement information based on the assigned rearrangement priorities; and rearranging, by the apparatus for managing stream processing tasks, the tasks based on the generated task rearrangement information.

Collecting the memory load state and the task execution frequency characteristics may include collecting, by the apparatus for managing stream processing tasks, task execution frequency characteristics including the frequencies of use of the tasks, recent execution times, and the sizes of task objects.

Collecting the memory load state and the task execution frequency characteristics may include collecting the memory load state including the amount of memory used based on the execution of the tasks.

Determining whether or not a shortage of memory has occurred may include determining, by the apparatus for managing stream processing tasks, that a shortage of memory has occurred if the amount of collected memory exceeds a predetermined amount of memory.

Detecting the low-frequency tasks may include detecting, by the apparatus for managing stream processing tasks, the low-frequency tasks in active tasks included in an active task pool based on the frequencies of execution or recent execution times included in the collected task execution frequency characteristics.

Assigning the rearrangement priorities may include assigning, by the apparatus for managing stream processing tasks, the rearrangement priorities based on the amounts of memory of the detected low-frequency tasks.

Generating the task rearrangement information may include generating, by the apparatus for managing stream processing tasks, task rearrangement information by arranging the rearrangement priorities in descending order.

Rearranging the tasks may include deleting, by the apparatus for managing stream processing tasks, the low-frequency tasks from memory based on the rearrangement priorities included in the task rearrangement information, and storing, by the apparatus for managing stream processing tasks, the deleted low-frequency tasks.

The method may further include classifying, by the apparatus for managing stream processing tasks, tasks into active tasks and sleep tasks based on the collected task execution frequency characteristics; loading, by the apparatus for managing stream processing tasks, tasks classified as the active tasks onto memory; and storing, by the apparatus for managing stream processing tasks, tasks classified as the sleep tasks in a storage unit.

The method may further include detecting, by the apparatus for managing stream processing tasks, the stored sleep tasks; loading, by the apparatus for managing stream processing tasks, the detected sleep tasks onto the memory, and executing, by the apparatus for managing stream processing tasks, the loaded sleep tasks; and deleting, by the apparatus for managing stream processing tasks, the sleep tasks from the memory once the execution of the sleep tasks has been completed.

BRIEF DESCRIPTION OF THE DRAWINGS

The above and other objects, features and advantages of the present invention will be more clearly understood from the following detailed description taken in conjunction with the accompanying drawings, in which:

FIGS. 5 to 7 are diagrams of an apparatus for managing stream processing tasks according to an embodiment of the present invention.

DESCRIPTION OF THE PREFERRED EMBODIMENTS

Figure 1:
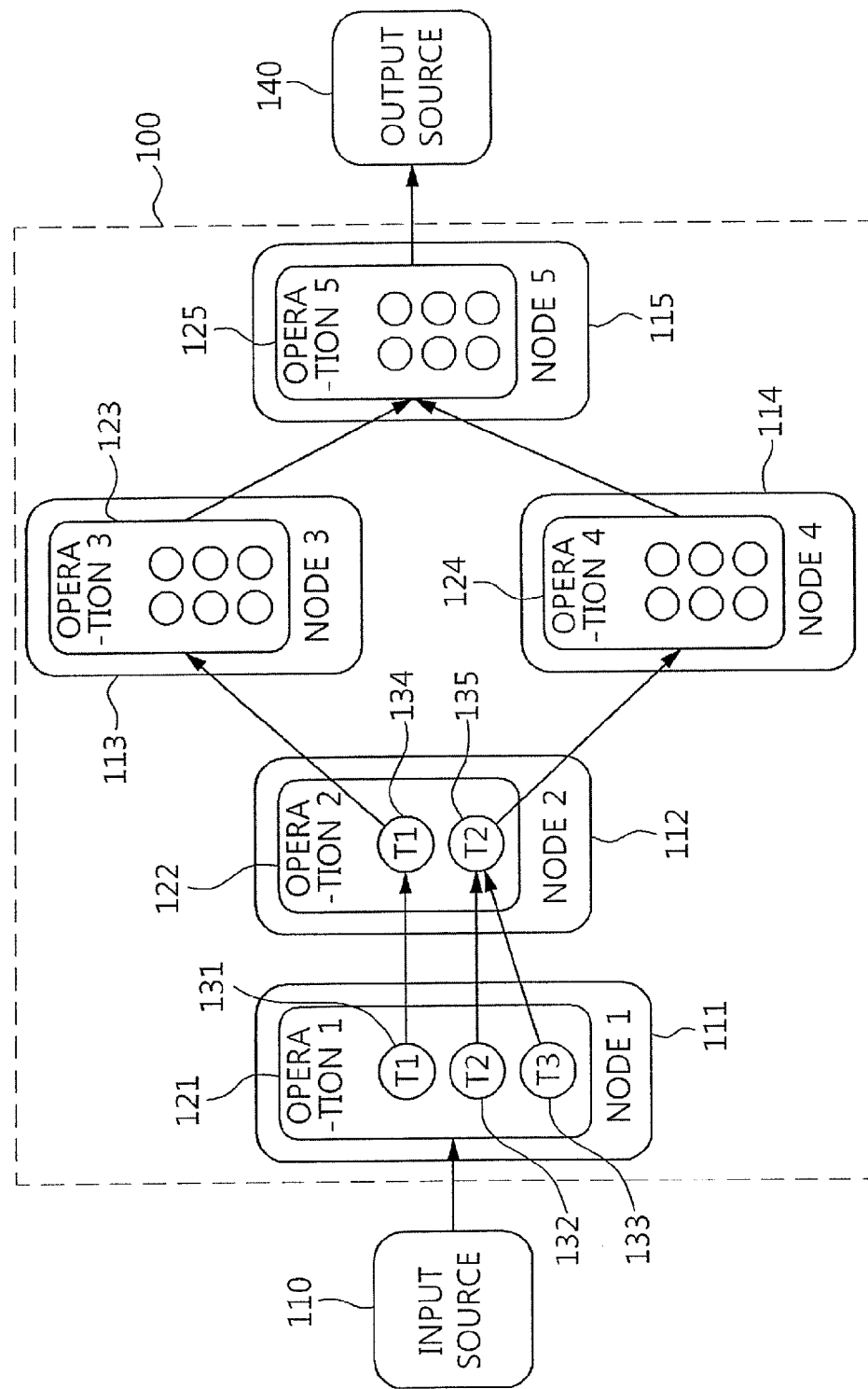
FIGS. 1 and 2 are diagrams of a conventional data stream distributed parallel processing system.
Figure 2:
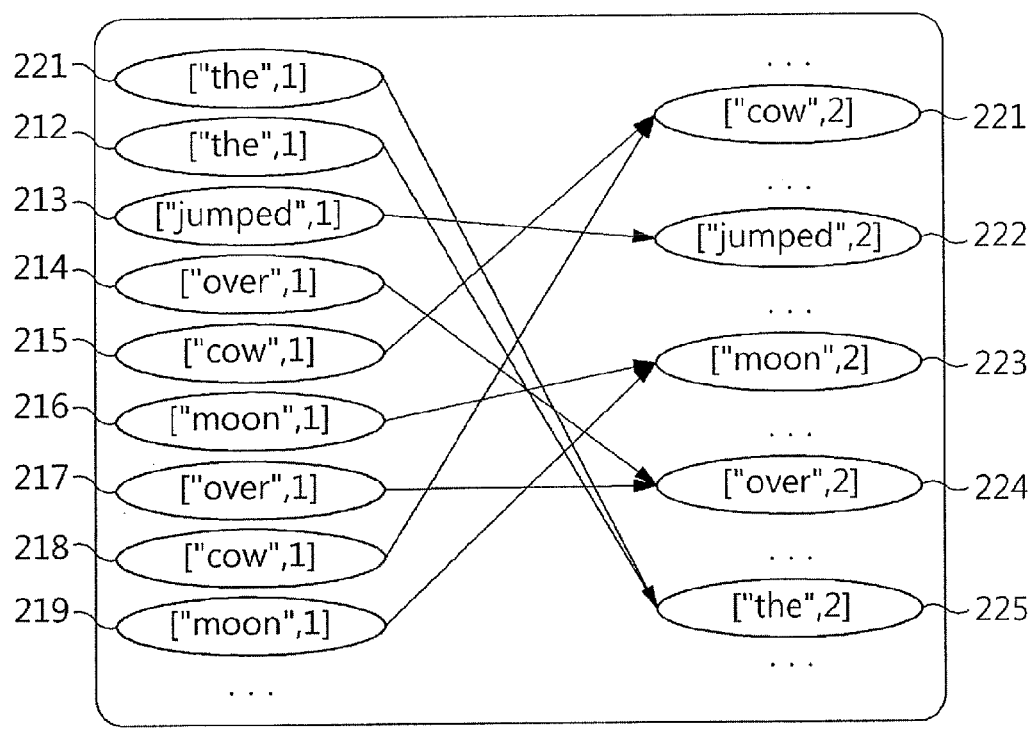

Embodiments of the present invention will be described with reference to the accompanying drawings in order to describe the present invention in detail so that those having ordinary knowledge in the technical field to which the present pertains can easily practice the present invention. It should be noted that same reference numerals are used to designate the same or similar elements throughout the drawings. In the following description of the present invention, detailed descriptions of known functions and constructions which are deemed to make the gist of the present invention obscure will be omitted.

Figure 3:
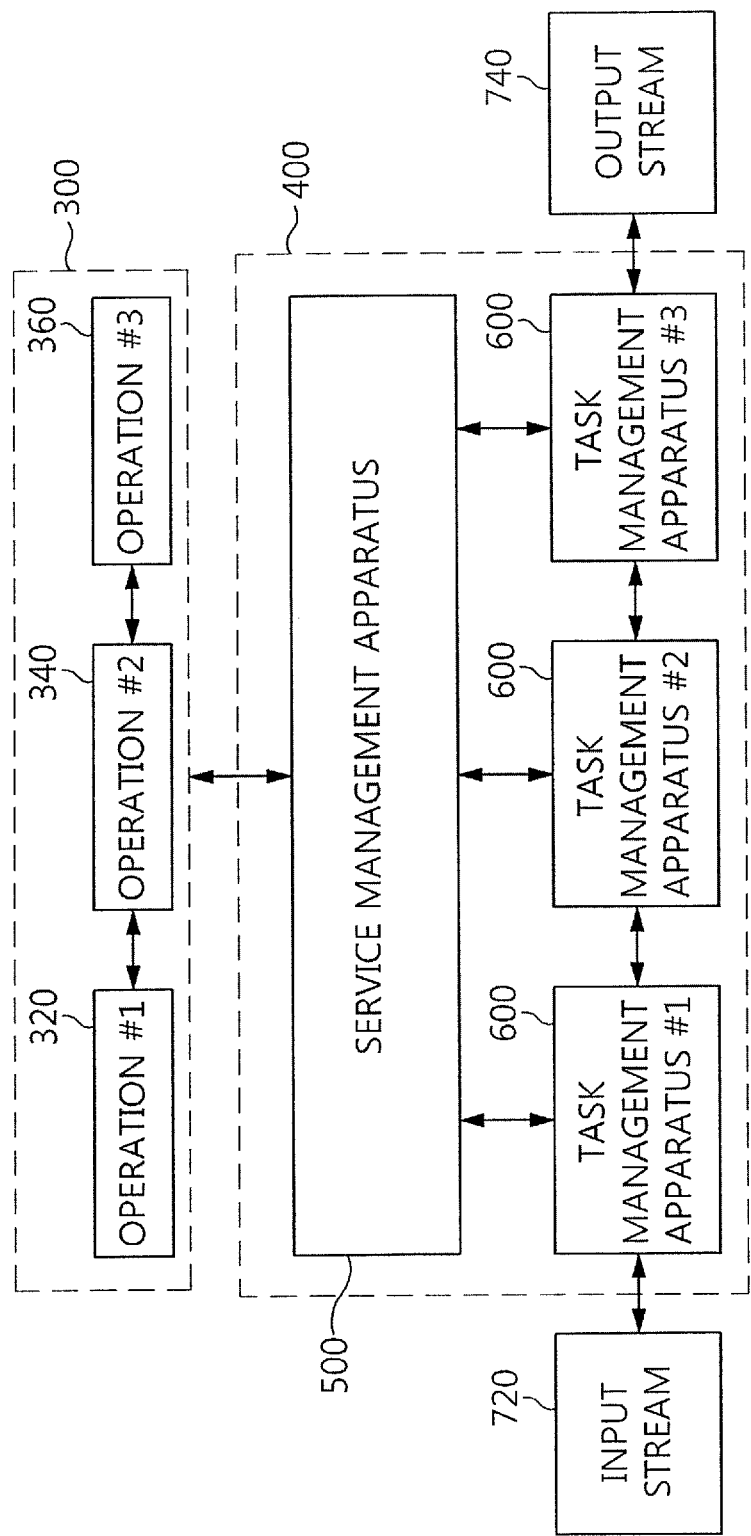
FIG. 3 is a block diagram of a data stream distributed parallel processing system including an apparatus for managing stream processing tasks according to an embodiment of the present invention.
Figure 4:
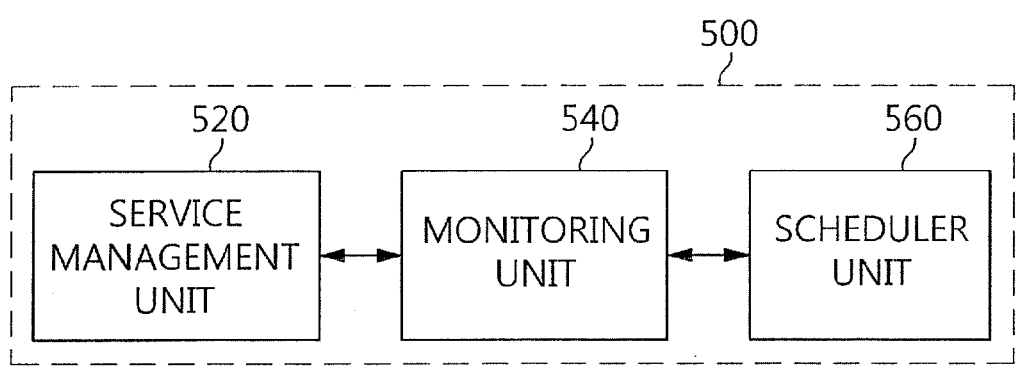
FIG. 4 is a block diagram of the service management apparatus of FIG. 3.
Figure 5:
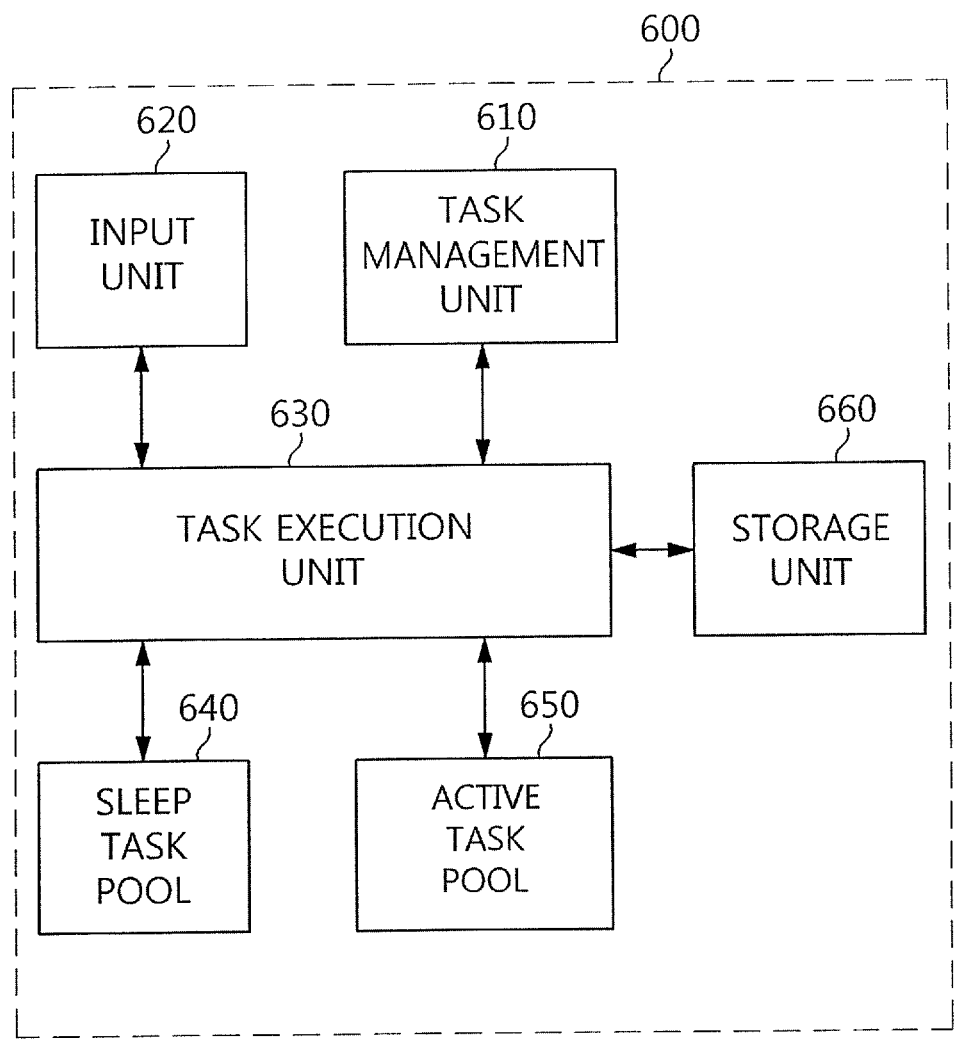
Figure 6:
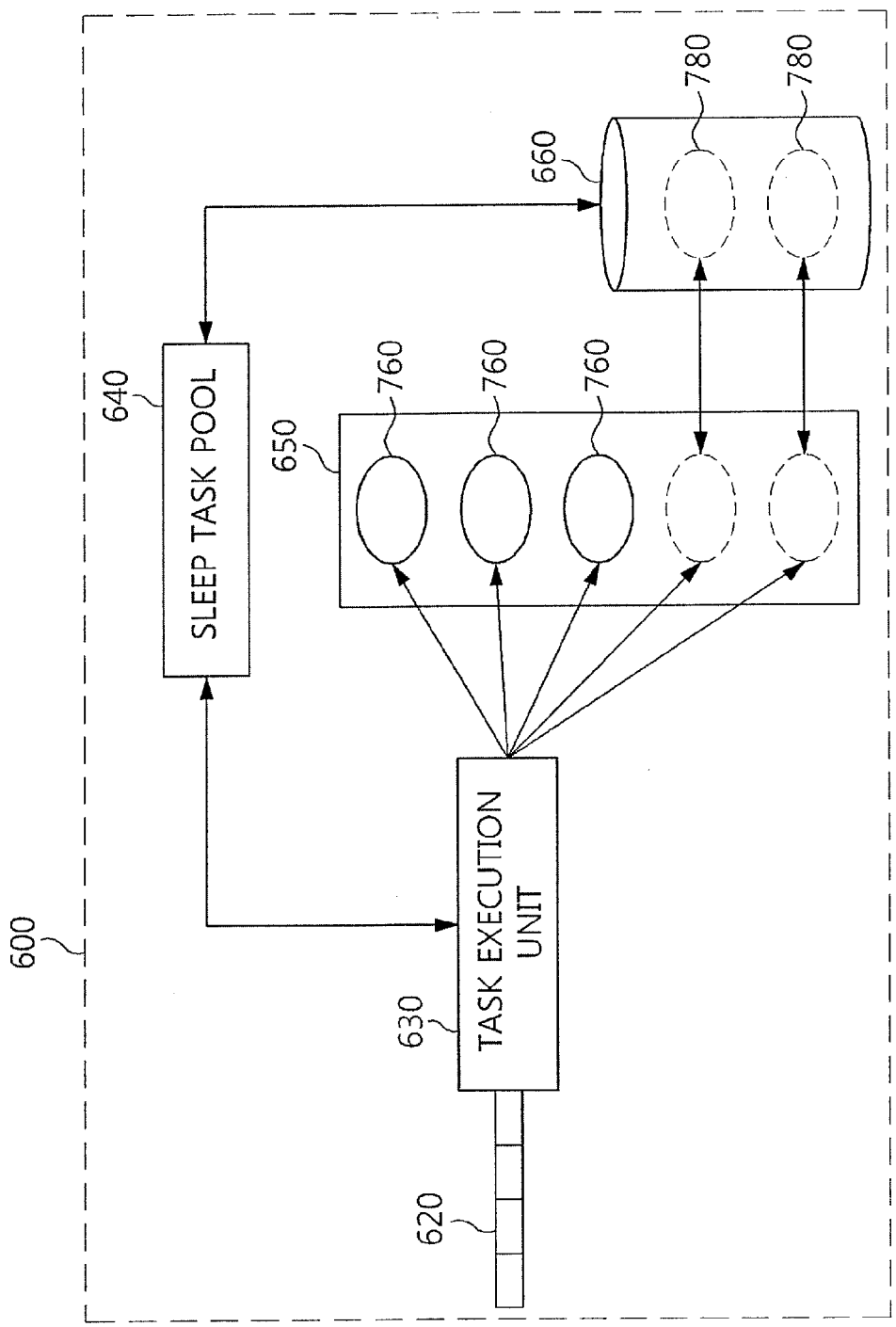

A data stream distributed parallel processing system including an apparatus for managing stream processing tasks according to an embodiment of the present invention will be described in detail below with reference to the accompanying drawings. FIG. 3 is a block diagram illustrating a data stream distributed parallel processing system including an apparatus for managing stream processing tasks according to an embodiment of the present invention. FIG. 4 is a block diagram of the service management apparatus of FIG. 3. FIGS. 5 to 7 are diagrams of an apparatus for managing stream processing tasks according to an embodiment of the present invention.

Referring to FIG. 3, a data stream service 300 includes a plurality of operations (e.g., an operation #1 320, an operation #2 340, and an operation #3 360), and there are flows of data streams between the operations. A data stream distributed parallel processing system 400 (including a service management apparatus 500 and a plurality of stream processing task management apparatuses 600 (hereinafter referred to as "task management apparatuses 600")) assigns the data stream service 300 to multiple nodes on a task basis. The data stream service 300 consecutively processes data streams while associating an input stream 720 with an output stream 740.

The data stream distributed parallel processing system 400 performs parallel segmentation processing on a plurality of operations included in the data stream service 300 with respect to the input stream 720, and outputs the output stream 740. For this purpose, the data stream distributed parallel processing system 400 includes the service management apparatus 500 and the plurality of task management apparatuses 600. If the data stream distributed parallel processing system 400 is implemented using software, each task management apparatus 600 is executed in each node, and the service management apparatus 500 may be included and executed in an additional node or a node in which the task management apparatus 600 is executed. Although the three task management apparatuses 600 have been illustrated in FIG. 3, the number of task management apparatuses 600 may vary depending on the configuration of the data stream distributed parallel processing system 400.

The service management apparatus 500 manages the data stream service 300. That is, the service management apparatus 500 processes user requests, such as the registration, deletion and search of the data stream service 300. The service management apparatus 500 collects information about resources within a node via the task management apparatus 600. That is, when the task management apparatus 600 processes the operations included in the data streaming service, the service management apparatus 500 periodically collects information about resources within a node. The service management apparatus 500 processes scheduling and re-scheduling for the processing of the operations included in the data stream service 300. For this purpose, as illustrated in FIG. 4, the service management apparatus 500 includes a service management unit 520, a monitoring unit 540, and a scheduler unit 560.

The service management unit 520 processes user requests, such as the registration, deletion and search of the data stream service 300.

That is, when a service registration request is received from a user, the service management unit 520 segments a plurality of operations that form a corresponding service into a plurality of tasks (i.e., distributed parallel processing tasks). The service management unit 520 requests the scheduler unit 560 to distribute and assign the segmented tasks to the plurality of the task management apparatuses 600. After the scheduler unit 560 has distributed and assigned the segmented tasks to the task management apparatuses 600, the service management unit 520 requests the plurality of task management apparatuses 600 to execute the tasks. In this case, the service management unit 520 may receive Quality of Service (QoS) information for each service, each operation, or each task from a user, and may register the received QoS information. The QoS information may be defined as the throughput of input data, or the like.

When a service deletion request is received from a user, the service management unit 520 requests a plurality of task management apparatuses 600, which execute the tasks corresponding to the plurality of operations forming the corresponding service, to terminate the execution of the tasks. The service management unit 520 deletes the plurality of operations that form the service. The service management unit 520 requests the scheduler unit 560 to delete the distributed and assigned tasks.

The monitoring unit 540 collects information about resources within a node via the task management apparatus 600. That is, the monitoring unit 540 periodically collects information about the amount of input load, the amount of output load, and data processing for each task and information about the state of use of resources for each node via the task execution unit 630 (refer to FIG. 5) of the task management apparatus 600. The monitoring unit 540 constructs and analyzes the QoS information and task rearrangement information of the data stream service 300 based on the collected information.

The monitoring unit 540 determines whether or not to schedule the service or the tasks within the service again based on information about whether or not the threshold of service processing performance is satisfied and about the trend of changes in the service processing performance. That is, the monitoring unit 540 determines whether or not to schedule the service or the tasks within the service again by checking whether or not the threshold of service processing performance received from a user is satisfied or by analyzing the trend of changes in the service processing performance over time. The monitoring unit 540 requests re-scheduling from the scheduler unit 560 based on information about whether or not to schedule the service or the tasks within the service again.

The monitoring unit 540 may receive a re-scheduling request for a specific task from the task execution unit 630 of the task management apparatus 600. In this case, the monitoring unit 540 requests the scheduler unit 560 to schedule the task again.

The scheduler unit 560 schedules tasks in response to a request from the service management unit 520 or the monitoring unit 540.

When a request for the distribution and assignment of tasks attributable to the registration of a service is received from the service management unit 520, the scheduler unit 560 schedules the tasks. That is, the scheduler unit 560 distributes and assigns the requested tasks to the plurality of task management apparatuses 600 based on predetermined policies.

When a request for the re-scheduling of the service or the tasks within the service is received from the monitoring unit 540, the scheduler unit 560 schedules the tasks. That is, the scheduler unit 560 assigns the requested service or tasks to the plurality of the task management apparatuses 600 based on predetermined policies.

In this case, the scheduler unit 560 selects a task management apparatus 600 having redundant resources based on information about resources within a node that has been collected from the monitoring unit 540 when a distribution and assignment request or a re-scheduling request is made. The scheduler unit 560 assigns one or more tasks to the selected task management apparatus 600.

The scheduler unit 560 determines policies, such as the adjustment of the ratio of resources to be assigned to tasks, the movement of tasks, the copying of tasks, and load shedding, in response to a re-scheduling request.

The task management apparatus 600 controls and manages the execution of tasks. In this case, the task management apparatus 600 collects and manages the state of resources based on the execution of the tasks. For this purpose, as illustrated in FIG. 5, the task management apparatus 600 includes a task management unit 610, an input unit 620, the task execution unit 630, a sleep task pool 640, an active task pool 650, and a storage unit 660.

The task management unit 610 controls and manages the execution of the tasks. That is, the task management unit 610 requests the task execution unit 630 to execute the tasks assigned by the service management apparatus 500. In this case, the task management unit 610 requests the execution of the threads of the tasks being executed by the task execution unit 630, and controls and manages the execution of the threads.

The input unit 620 operates as the input buffer of the task execution unit 630. That is, the input unit 620 receives a data stream from the task management apparatus 600 or the tasks being executed by the same task management apparatus 600. The input unit 620 sends the received data stream to the task execution unit 630.

The task execution unit 630 executes the assigned tasks in response to a request from the task management unit 610. That is, the task execution unit 630 binds an input data stream source and an output data stream source for the assigned tasks. The task execution unit 630 consecutively executes the assigned tasks as threads separate from those of other task execution units 630.

The task execution unit 630 collects task execution frequency characteristics based on the execution of tasks. In this case, the task execution unit 630 collects execution frequency characteristics that include the frequencies of use of the tasks, recent execution times, and the sizes of task objects.

The task execution unit 630 classifies all tasks, managed by each task management apparatus 600, into active tasks 760 and sleep tasks 780 depending on their frequency of use, and manages the classified tasks. That is, the task execution unit 630 classifies tasks into the active tasks 760 and the sleep tasks 780 based on the frequencies of use included in execution frequency characteristics that have been collected during the execution of tasks. In this case, the task execution unit 630 may classify a high-frequency task as the active task 760 and a low-frequency task as the sleep task 780. In this case, the task execution unit 630 may set a reference value for the frequency of use. If the frequency of use is equal to or higher than the reference value, the task execution unit 630 may classify a task as the active task 760. If the frequency of use is lower than the reference value, the task execution unit 630 may classify a task as the sleep task 780.

The task execution unit 630 collects a memory load state based on the execution of tasks. That is, the task execution unit 630 collects a memory load state including the amount of memory used based on the execution of the tasks. In this case, the task execution unit 630 may collect a memory load state including the states of tasks being executed and the state of exhaustion of the memory of a local node.

The task execution unit 630 determines whether or not a shortage of memory has occurred based on the collected memory load state. That is, the task execution unit 630 determines that a shortage of memory has occurred if the collected amount of memory used exceeds the predetermined amount of memory.

The task execution unit 630 performs in-memory stream processing task management functions. Although the in-memory stream processing task management functions may be various, the in-memory stream processing task management functions may include a task swapping function of managing all possible tasks in an in-memory state, deleting only infrequently executed tasks from the memory and loading the tasks onto the memory again and a task caching function of basically loading only frequently executed tasks onto memory, executing the tasks, and storing most of tasks in the storage unit 660. The task swapping function and the task caching function may be selectively set by taking advantages and disadvantages (refer to FIG. 7) into consideration depending on an execution environment.

When a shortage of memory occurs, the task execution unit 630 detects low-frequency tasks in tasks included in the active task pool 650, and rearranges the detected tasks. That is, when memory resources are exhausted because excessive task objects are loaded onto in-memory because of the execution of excessive tasks, the task execution unit 630 arranges tasks included in the active task pool 650 between the memory and a disk.

For this purpose, the task execution unit 630 detects low-frequency tasks based on execution frequency characteristics and the sizes of tasks, and generates task rearrangement information about the detected tasks. That is, the task execution unit 630 detects low-frequency tasks in tasks included in the active task pool 650 based on previously collected execution frequency characteristics. In this case, the task execution unit 630 detects low-frequency tasks in ascending order of the frequency of use or in descending order of recent execution time.

The task execution unit 630 sets priorities for the detected low-frequency tasks. That is, the task execution unit 630 sets priorities based on the sizes (i.e., the amounts of occupied memory) of the detected low-frequency tasks. In this case, the task execution unit 630 sets priorities in descending order of the amount of memory.

The task execution unit 630 generates task rearrangement information based on the set priorities. That is, the task execution unit 630 generates task rearrangement information by arranging low-frequency tasks in descending order of the amount of memory.

The task execution unit 630 rearranges the tasks based on the generated rearrangement information. That is, the task execution unit 630 stores low-frequency tasks in the storage unit 660 by sequentially removing the tasks from memory in the order that the tasks are arranged based on the task rearrangement information. In this case, the task execution unit 630 removes the low-frequency tasks from the memory until a specific amount of memory is ensured.

The sleep task pool 640 manages tasks that have been classified as the sleep tasks 780 by the task execution unit 630. In this case, the sleep task pool 640 manages a list of tasks that have been classified as the sleep tasks 780. That is, the sleep task pool 640 manages only a list of the sleep tasks 780, and the sleep tasks 780 are removed from memory and stored in the storage unit 660.

The active task pool 650 manages tasks classified as the active tasks 760 by the task execution unit 630, and a list of the active tasks 760. In this case, the active task pool 650 loads the active tasks 760, managed in the active task pool 650, onto the memory and then manages the active tasks 760 because the active tasks 760 are periodically (or frequently) executed.

The active task pool 650 manages the sleep tasks 780 executed by the task execution unit 630. That is, when the task execution unit 630 executes the sleep tasks 780 stored in the storage unit 660, the active task pool 650 loads the sleep tasks 780 onto memory and manages the loaded sleep tasks 780.

The storage unit 660 stores the sleep tasks 780. That is, the storage unit 660 stores low-frequency tasks that have been classified as the sleep tasks 780.

Figure 8:
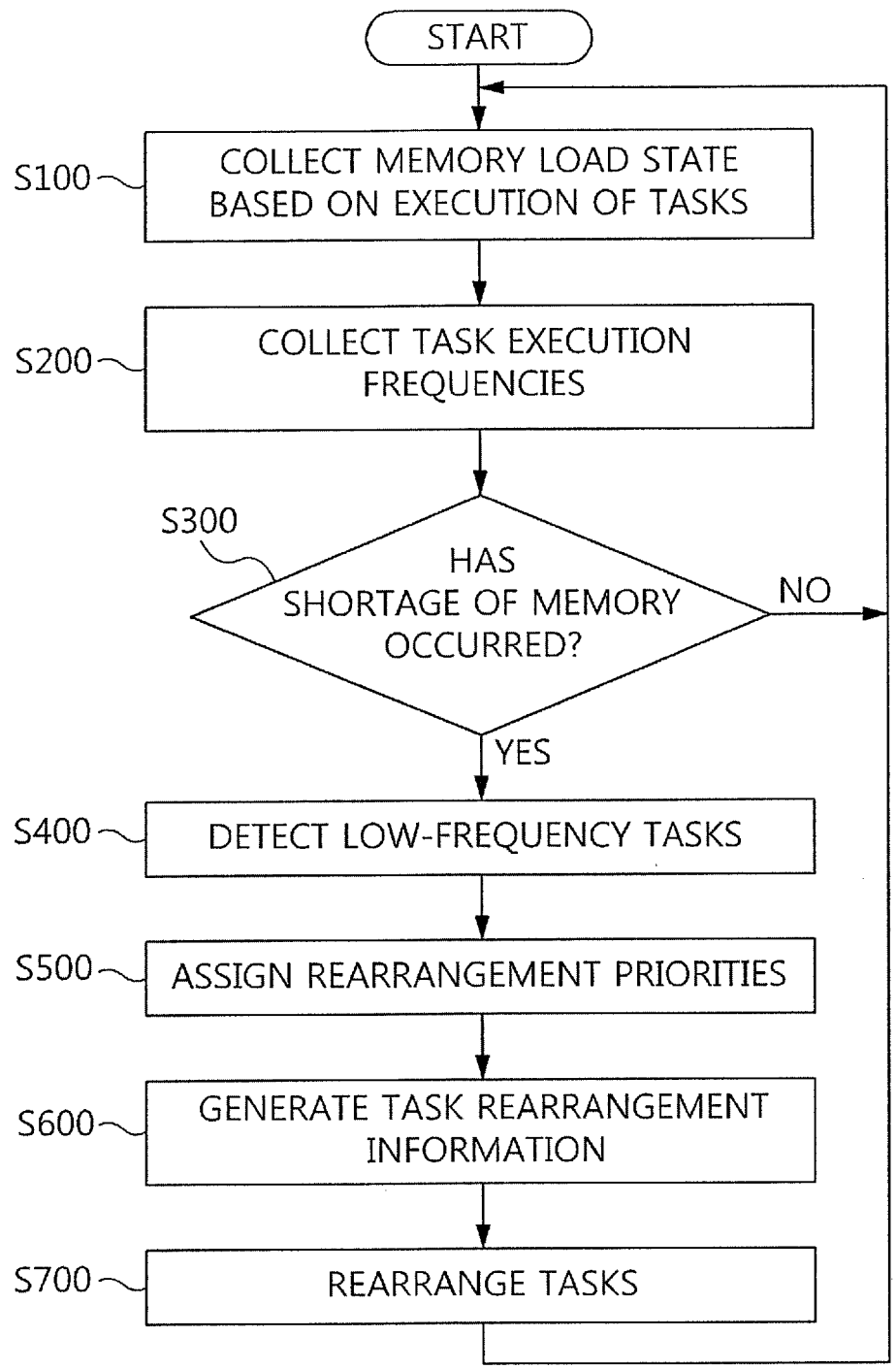
FIG. 8 is a flowchart of a method of managing stream processing tasks according to an embodiment of the present invention.

A method of managing stream processing tasks according to an embodiment of the present invention will be described in detail below with reference to the accompanying drawings. FIG. 8 is a flowchart of the method of managing stream processing tasks according to an embodiment of the present invention.

The task management apparatus 600 collects a memory load state based on the execution of tasks at step S100. That is, the task management apparatus 600 collects the amount of memory used by assigned tasks while consecutively executing the assigned tasks. In this case, the task execution unit 630 may collect a memory load state including the states of tasks being executed and the state of exhaustion of the memory of a local node.

The task management apparatus 600 collects task execution frequency characteristics based on the execution of the tasks at step S200. That is, the task execution unit 630 collects the execution frequency characteristics that include the frequencies of use of the tasks, recent execution times, and the sizes of task objects. In this case, the task execution unit 630 classifies all tasks, managed by each task management apparatus 600, into the active tasks 760 and the sleep tasks 780 depending on their frequency of use, and then manages the classified tasks. That is, the task execution unit 630 classifies the tasks into the active tasks 760 and the sleep tasks 780 based on the frequency of use included in the execution frequency characteristics that were collected when the tasks were executed. In this case, the task execution unit 630 may classify a high-frequency task as the active task 760 and a low-frequency task as the sleep task 780. In this case, the task execution unit 630 may set a reference value for the frequency of use. If the frequency of use is equal to or higher than the reference value, the task execution unit 630 may classify a task as the active task 760. If the frequency of use is lower than the reference value, the task execution unit 630 may classify a task as the sleep task 780. In this case, the high-frequency active tasks 760 are loaded onto an in-memory device, executed, and managed by the active task pool 650. The low-frequency sleep tasks 780 are stored in the storage unit 660 and managed by the sleep task pool 640. That is, a low-frequency task is stored in an additional storage unit 660, loaded from the storage unit 660 to memory whenever the task needs to be executed, executed, and then removed from the memory.

The task management apparatus 600 determines whether or not a shortage of memory has occurred by comparing the amount of collected memory used with the predetermined amount of memory of the system at step S300. If, as a result of the determination, it is determined that the amount of collected memory used exceeds the predetermined amount of memory and thus a shortage of memory has occurred (Yes at step S300), the task management apparatus 600 detects low-frequency tasks based on previously collected task execution frequency characteristics at step S400. That is, the task management apparatus 600 detects low-frequency tasks in the active tasks 760 included in the active task pool 650 based on the frequencies of execution or recent execution times that are included in the previously collected task execution frequency characteristics. In this case, the task execution unit 630 detects low-frequency tasks in ascending order of the frequency of use or descending order of recent execution time.

The task management apparatus 600 assigns rearrangement priorities to the detected low-frequency tasks at step S500. That is, the task execution unit 630 sets priorities based on the sizes (i.e., the occupied amounts of memory) of the detected low-frequency tasks. In this case, the task execution unit 630 sets priorities in descending order of the amount of memory.

The management apparatus generates task rearrangement information based on the assigned rearrangement priorities at step S600. That is, the task execution unit 630 generates task rearrangement information by arranging the low-frequency tasks in descending order of the amount of memory.

The task management apparatus 600 rearranges the tasks based on the generated task rearrangement information at step S700. That is, the task management apparatus 600 deletes tasks from the memory according to the rearrangement priorities included in the task rearrangement information, and stores the deleted tasks in the storage unit 660.

As described above, in accordance with the apparatus and method for managing stream processing tasks, which, when memory resources are exhausted because of stream processing task objects that are executed on a large scale, efficiently arrange tasks being executed in individual nodes between memory and a disk based on the analysis of the frequencies of execution of the tasks so as to be suitable for the execution frequency characteristics of the tasks, so that the tasks are executed under in-memory management. Accordingly, the apparatus and method for managing stream processing tasks have the advantages of reducing the processing time it takes to execute explosively increasing data streams and guaranteeing performance without reducing the accuracy of stream data processing even in a limited memory situation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus having a non-transitory computer readable recording medium (CRRM) containing programming instructions configured for managing stream processing tasks, comprising:
    a task management unit configured to control and manage execution of assigned tasks; and
    a task execution unit configured to execute the tasks in response to a request from the task management unit, to collect a memory load state and task execution frequency characteristics based on the execution of the tasks, to detect low-frequency tasks based on predetermined policies for the execution frequency characteristics if it is determined that a shortage of memory has occurred based on the memory load state, to assign rearrangement priorities to the low-frequency tasks, and to rearrange the tasks based on the assigned rearrangement priorities, wherein the task execution unit detects the low-frequency tasks in active tasks included in an active task pool based on their frequencies of execution or recent execution times included in the collected task execution frequency characteristics.

2. The apparatus of claim 1, wherein the task execution unit collects the memory load state including an amount of memory used based on the execution of the tasks and the task execution frequency characteristics based on the predetermined policies which include frequencies of use of the tasks, recent execution times, and sizes of task objects.

3. The apparatus of claim 1, wherein the task execution unit determines that a shortage of memory has occurred if an amount of memory used included in the collected memory load state exceeds a predetermined amount of memory.

4. The apparatus of claim 1, wherein the task execution unit assigns the rearrangement priorities based on amounts of memory of the detected low-frequency tasks.

5. The apparatus of claim 1, wherein the task execution unit generates task rearrangement information by arranging the rearrangement priorities in descending order, and deletes the low-frequency tasks from memory based on the rearrangement priorities included in the task rearrangement information.

6. The apparatus of claim 5, further comprising a storage unit for storing tasks, wherein the task execution unit stores the detected low-frequency tasks in the storage unit.

7. The apparatus of claim 1, wherein the task execution unit classifies the tasks into active tasks and sleep tasks based on the collected task execution frequency characteristics, loads tasks classified as the active tasks onto memory, executes the loaded tasks, and stores tasks classified as the sleep tasks into the storage unit.

8. The apparatus of claim 7, wherein the task execution unit loads the sleep tasks detected from the storage unit onto the memory, executes the loaded tasks, and deletes the sleep tasks from the memory once the execution of the sleep tasks has been completed.

9. The apparatus of claim 7, further comprising:
    an active task pool configured to manage the tasks classified as the active tasks by the task execution unit and a list of the tasks; and
    a sleep task pool configured to manage a list of the tasks classified as the sleep tasks by the task execution unit;
    wherein the storage unit stores the tasks classified as the sleep tasks by the task execution unit.

10. A non-transitory computer readable recording medium (CRRM) containing programming instructions configured to perform a method of managing stream processing tasks, comprising:
    collecting, by an apparatus for managing stream processing tasks, a memory load state and task execution frequency characteristics based on execution of tasks;
    determining, by the apparatus for managing stream processing tasks, whether or not a shortage of memory has occurred based on the collected memory load state;
    detecting, by the apparatus for managing stream processing tasks, low-frequency tasks based on the collected task execution frequency characteristics if, as a result of the determination, it is determined that a shortage of memory has occurred, wherein detecting the low-frequency tasks comprises detecting, by the apparatus for managing stream processing tasks, the low-frequency tasks in active tasks included in an active task pool based on predetermined policies for frequencies of execution or for recent execution times included in the collected task execution frequency characteristics;
    assigning, by the apparatus for managing stream processing tasks, rearrangement priorities to the detected low-frequency tasks;
    generating, by the apparatus for managing stream processing tasks, task rearrangement information based on the assigned rearrangement priorities; and
    rearranging, by the apparatus for managing stream processing tasks, the tasks based on the generated task rearrangement information.

11. The CRRM of claim 10, wherein collecting the memory load state and the task execution frequency characteristics comprises collecting, by the apparatus for managing stream processing tasks, task execution frequency characteristics being based on the predetermined policies which include frequencies of use of the tasks, recent execution times, and sizes of task objects.

12. The CRRM of claim 10, wherein collecting the memory load state and the task execution frequency characteristics comprises collecting the memory load state including an amount of memory used based on the execution of the tasks.

13. The CRRM of claim 12, wherein determining whether or not a shortage of memory has occurred comprises determining, by the apparatus for managing stream processing tasks, that a shortage of memory has occurred if the amount of collected memory exceeds a predetermined amount of memory.

14. The CRRM of claim 10, wherein assigning the rearrangement priorities comprises assigning, by the apparatus for managing stream processing tasks, the rearrangement priorities based on amounts of memory of the detected low-frequency tasks.

15. The CRRM of claim 10, wherein generating the task rearrangement information comprises generating, by the apparatus for managing stream processing tasks, task rearrangement information by arranging the rearrangement priorities in descending order.

16. The CRRM of claim 10, wherein rearranging the tasks comprises deleting, by the apparatus for managing stream processing tasks, the low-frequency tasks from memory based on the rearrangement priorities included in the task rearrangement information, and storing, by the apparatus for managing stream processing tasks, the deleted low-frequency tasks.

17. The CRRM of claim 10, further comprising:
classifying, by the apparatus for managing stream processing tasks, tasks into active tasks and sleep tasks based on the collected task execution frequency characteristics;
loading, by the apparatus for managing stream processing tasks, tasks classified as the active tasks onto memory; and
storing, by the apparatus for managing stream processing tasks, tasks classified as the sleep tasks in a storage unit.

18. The CRRM of claim 17, further comprising:
detecting, by the apparatus for managing stream processing tasks, the stored sleep tasks;
loading, by the apparatus for managing stream processing tasks, the detected sleep tasks onto the memory, and executing, by the apparatus for managing stream processing tasks, the loaded sleep tasks; and
deleting, by the apparatus for managing stream processing tasks, the sleep tasks from the memory once the execution of the sleep tasks has been completed.

\* \* \* \* \*